(12) United States Patent
Nishioka

(10) Patent No.: US 7,499,221 B2
(45) Date of Patent: Mar. 3, 2009

(54) OPTICAL APPARATUS

(75) Inventor: Kimihiko Nishioka, Hachioji (JP)

(73) Assignee: Olympus Corporation, Tokyo (JP)

( * ) Notice: Subject to any disclaimer, the term of this patent is extended or adjusted under 35 U.S.C. 154(b) by 214 days.

(21) Appl. No.: 11/281,515

(22) Filed: Nov. 18, 2005

(65) Prior Publication Data

US 2006/0109558 A1    May 25, 2006

(30) Foreign Application Priority Data

Nov. 22, 2004    (JP) .............................. 2004-337755

(51) Int. Cl.
*G02B 1/00* (2006.01)
*G02B 3/00* (2006.01)

(52) U.S. Cl. ...................... 359/652; 359/642

(58) Field of Classification Search ......... 359/652–654, 359/642
See application file for complete search history.

(56) References Cited

U.S. PATENT DOCUMENTS 5,623,370 A * 4/1997 Ueda et al. .................. 359/654

7,218,285 B2 * 5/2007 Davis et al. .................. 343/754

OTHER PUBLICATIONS

"Structure and Application of Optical System", pp. 73-77, pp. 166-170, published Nov. 19, 2008.
J.B. Pendry, "Negative Refraction Makes a Perfect Lens," *Physical Review Letters*, vol. 85, No. 18, pp. 3966-3969, Oct. 30, 2000.
M. Notomi, "Theory of Light Propagation in Strongly Modulated Photonic Crystals: Refractionlike Behavior in the Vicinity of the Photonic Band Gap," *Physical Review B*, vol. 62, No. 16, pp. 10696-10705, Oct. 15, 2000.
L. Liu and S. He, "Near-field Optical Storage System Using a Solid Immersion Lens with a Left-handed Material Slab," *Optics Express*, vol. 12, No. 20, pp. 4835-4840, Oct. 4, 2004.
V.G. Veselago, "The Electrodynamics of Substances with Simultaneously Negative Values of ε and μ," *Soviet Physics*, Usp. vol. 10, pp. 509-514, Jan.-Feb. 1968.

* cited by examiner

*Primary Examiner*—Scott J Sugarman
(74) *Attorney, Agent, or Firm*—Kenyon & Kenyon LLP

(57) ABSTRACT

An optical apparatus includes an optical element that is made of a medium exhibiting negative refraction. A correction varies a wavelength of light used, thereby correcting a variation in image forming capability, which occurs due to one of a variation in refractive index of the optical element and a variation in refractive index of a surrounding medium.

32 Claims, 7 Drawing Sheets

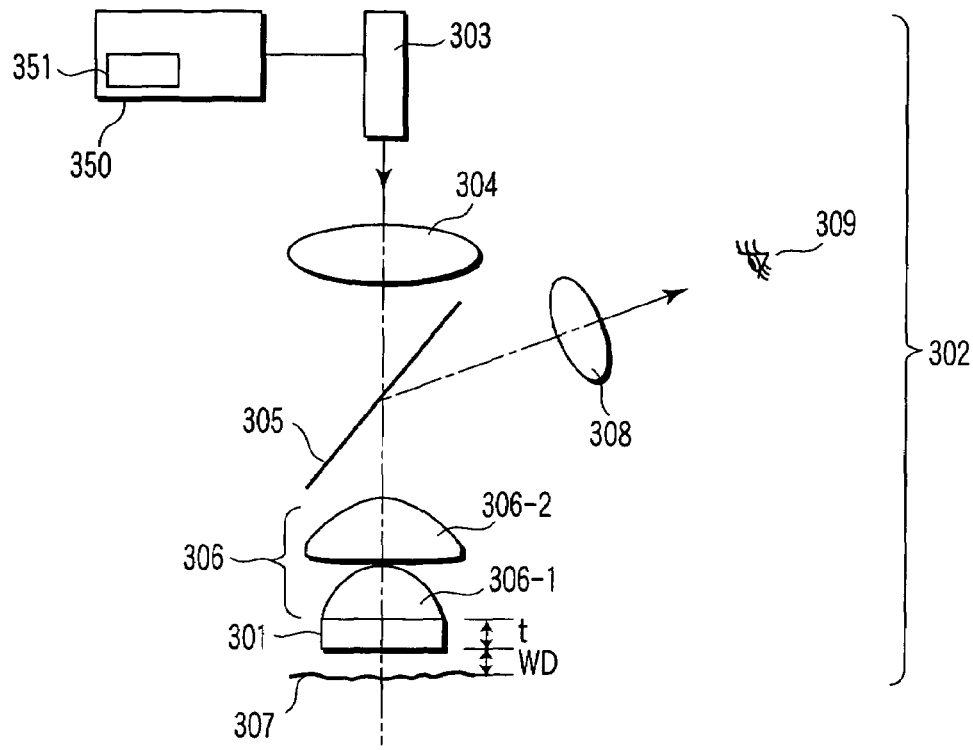
F I G. 1
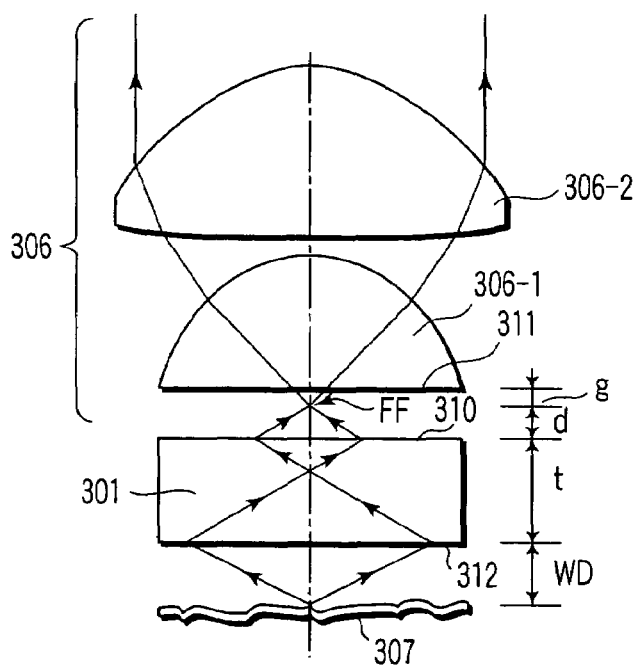
F I G. 2

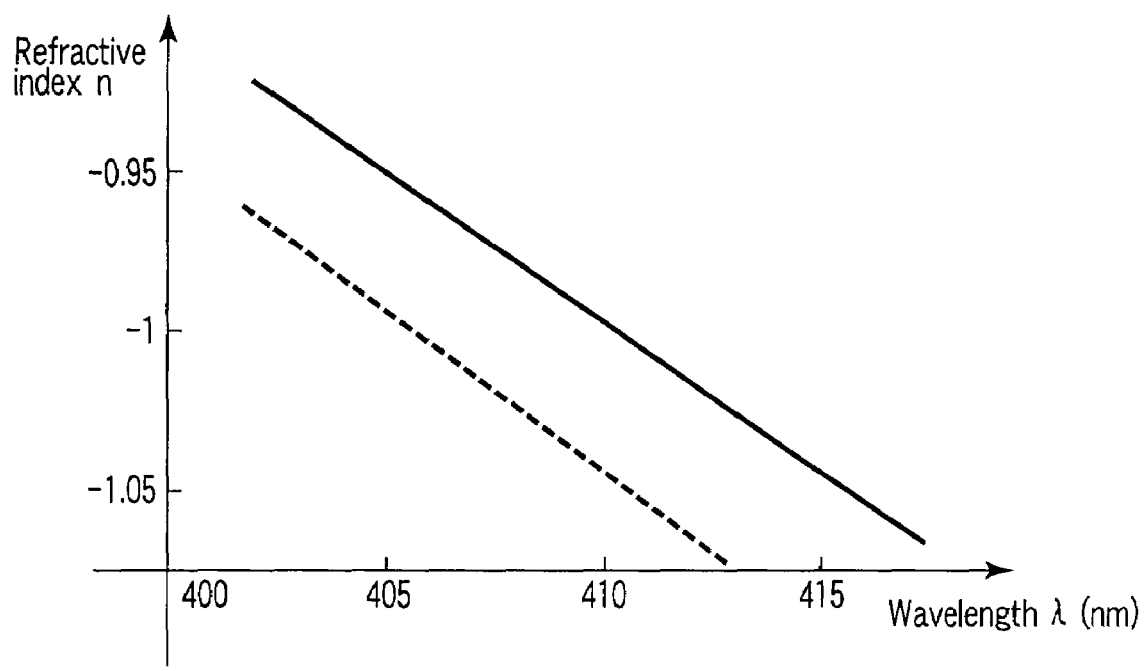
F I G. 3

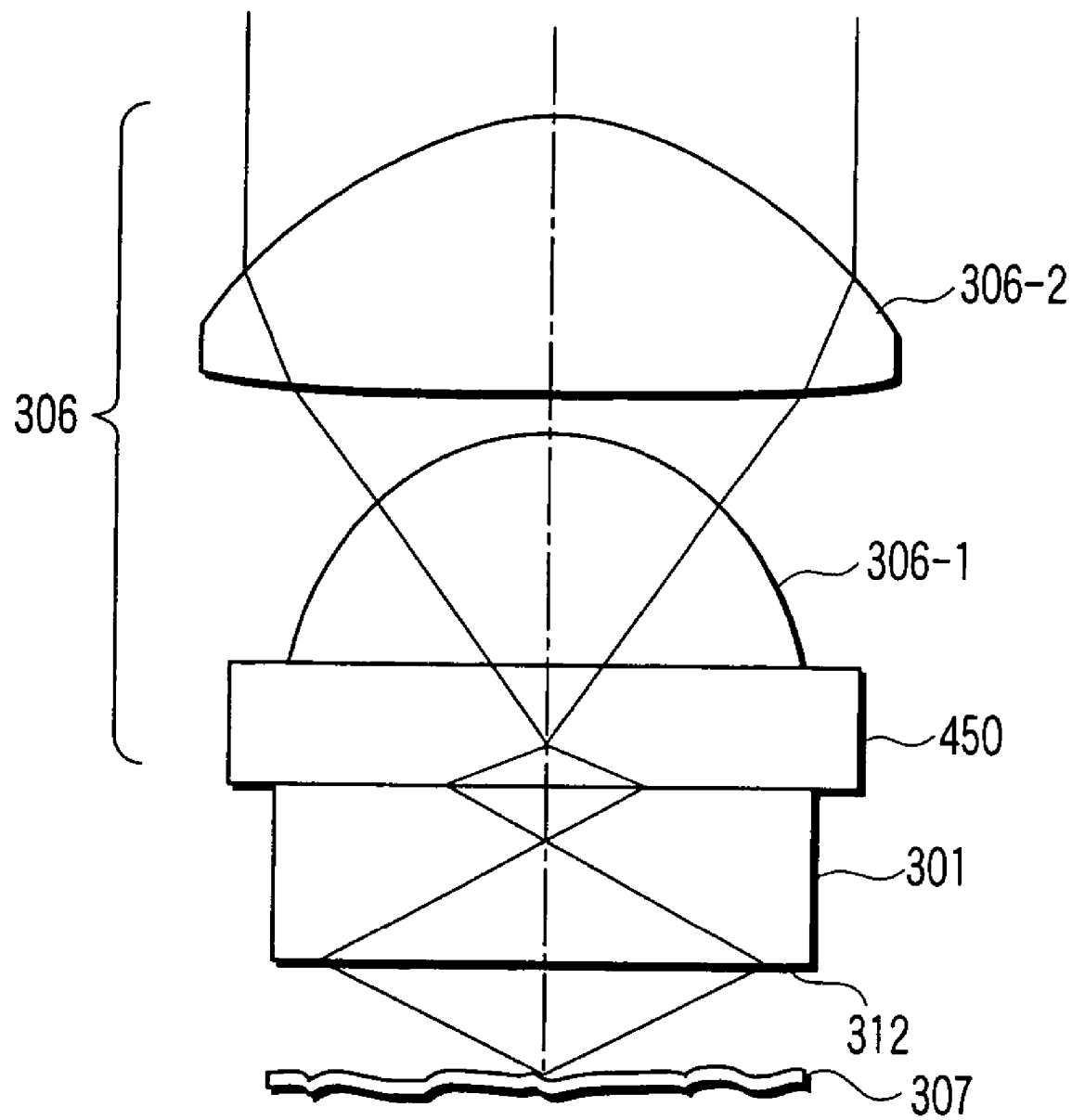
F I G. 12

OPTICAL APPARATUS

CROSS-REFERENCE TO RELATED APPLICATIONS

This application is based upon and claims the benefit of priority from prior Japanese Patent Application No. 2004-337755, filed Nov. 22, 2004, the entire contents of which are incorporated herein by reference.

BACKGROUND OF THE INVENTION

1. Field of the Invention

The present invention relates to an optical apparatus using an optical system such as an optical element, a microscope, a lithographic optical system or an optical system of an optical disk.

2. Description of the Related Art

In the prior art, in these optical systems, in order to increase resolution, it has been proposed that an object-side numerical aperture (NA) is increased by a method such as a water-immersion method, oil-immersion method or solid-immersion method (see non-patent document 1 listed below). On the other hand, there are the following documents (non-patent documents 2 and 3, and patent documents 1 and 2) relating to materials (e.g. photonic crystal) that exhibit refractive characteristics different from those of an ordinary glass lens and the like.

(1) Non-patent document 1: "Structure and Application of Optical System", pp. 73-77, pp. 166-170, Optronics Co., Ltd., Published on Nov. 19, 2003,
(2) Non-patent document 2: J. B. Pendry Phys. Rev. Lett., Vol. 85, 18 (2000) 3966-3969,
(3) Non-patent document 3: M. Notomi, Phy. Rev. B. Vol. 62 (2000) 10696,
(4) Non-patent document 4: L. Liu and S. He Optics Express Vol. 12, No. 20 4835-4840 (2004),
(5) Non-patent document 5: V. G. Veselago, Sov. Phys. Usp. Vol. 10, 509-514 (1968),
(6) Patent document 1: US 2003/0227415 A1, and
(7) Patent document 2: US 2002/0175693 A1.

In the prior-art methods, however, a sample surface, an optical disk surface or a wafer surface contacts a lens, water, oil or a photomask, or only a small distance of about 30 nm is provided therebetween. Thus, the working distance (WD) is too short, leading to a practical problem such as damage to a sample, a lens, etc. In order to solve this problem, an optical system using a medium with a negative refractive index was proposed in non-patent document 4.

BRIEF SUMMARY OF THE INVENTION

According to a first aspect of the present invention, there is provided an optical apparatus comprising: an optical element that is made of a medium exhibiting negative refraction; and a correction unit that varies a wavelength of light used, thereby correcting a variation in image forming capability, which occurs due to one of a variation in refractive index of the optical element and a variation in refractive index of a surrounding medium.

According to a second aspect of the present invention, there is provided an optical apparatus comprising: a light source; an optical element that is made of a medium exhibiting negative refraction; and a correction unit that varies a wavelength of light used, and thus corrects one of a variation in refractive index of the optical element and a variation in refractive index of a surrounding medium, thereby correcting a variation in image forming capability, which occurs due to one of the variation in refractive index of the optical element and the variation in refractive index of the surrounding medium.

According to a third aspect of the present invention, there is provided an optical apparatus comprising: a light source with a variable wavelength; an optical element that is made of a medium exhibiting negative refraction; and a correction unit that varies a wavelength of emission light from the light source and thus corrects one of a variation in refractive index of the optical element and a variation in refractive index of a surrounding medium, thereby correcting a variation in image forming capability due to one of the variation in refractive index of the optical element and the variation in refractive index of the surrounding medium.

According to a fourth aspect of the present invention, there is provided an optical apparatus comprising: an optical element that is made of a medium exhibiting negative refraction; and a correction unit that varies a spectral transmittance of a filter that is disposed in an optical path, and varies a wavelength of light used, and thus corrects one of a variation in refractive index of the optical element and a variation in refractive index of a surrounding medium, thereby correcting a variation in image forming capability, which occurs due to one of the variation in refractive index of the optical element and the variation in refractive index of the surrounding medium.

According to a fifth aspect of the present invention, there is provided an optical apparatus comprising: an optical element that is made of a medium exhibiting negative refraction; and a correction unit that varies a spectral transmittance of a filter that is disposed in an optical path, and varies a wavelength of light used, thereby correcting a variation in image forming capability, which occurs due to one of a variation in refractive index of the optical element and a variation in refractive index of a surrounding medium.

According to a sixth aspect of the present invention, there is provided an optical apparatus comprising: a light source; an optical element that is made of a medium exhibiting negative refraction; and a control unit that limits a wavelength of emission light from the light source within a predetermined tolerable range, thereby suppressing a variation in image forming capability due to a variation in wavelength of the emission light from the light source.

According to a seventh aspect of the present invention, there is provided an optical apparatus comprising: a light source; an optical element that is made of a medium exhibiting negative refraction; and a correction unit that varies a wavelength of emission light from the light source by replacing the light source, and thus corrects one of a variation in refractive index of the optical element and a variation in refractive index of a surrounding medium, thereby correcting a variation in image forming capability, which occurs due to one of the variation in refractive index of the optical element and the variation in refractive index of the surrounding medium.

According to an eighth aspect of the present invention, there is provided an optical apparatus comprising: a light source; and an optical element that is made of a medium exhibiting negative refraction, wherein at a time of manufacturing the optical apparatus, a wavelength of emission light from the light source is varied by replacing the light source, and an optimal light source is selected, and thus one of a variation in refractive index of the optical element and a variation in refractive index of a surrounding medium is corrected, thereby correcting a variation in image forming capability, which occurs due to one of the variation in refractive index of the optical element and the variation in refractive index of the surrounding medium.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows an embodiment of the present invention, which is an example of a reflected-light microscope 302 using a negative index medium 301;

FIG. 2 is an enlarged view of a part in the vicinity of an objective lens 306 shown in FIG. 1;

FIG. 3 is a graph showing a relationship between a wavelength and a refractive index;

FIG. 12 is a view showing an example of a reflected-light microscope 302 using a negative index medium 301 that is formed on a flat plate 450 made of a material with a positive refractive index.

DETAILED DESCRIPTION OF THE INVENTION

Figure 4:
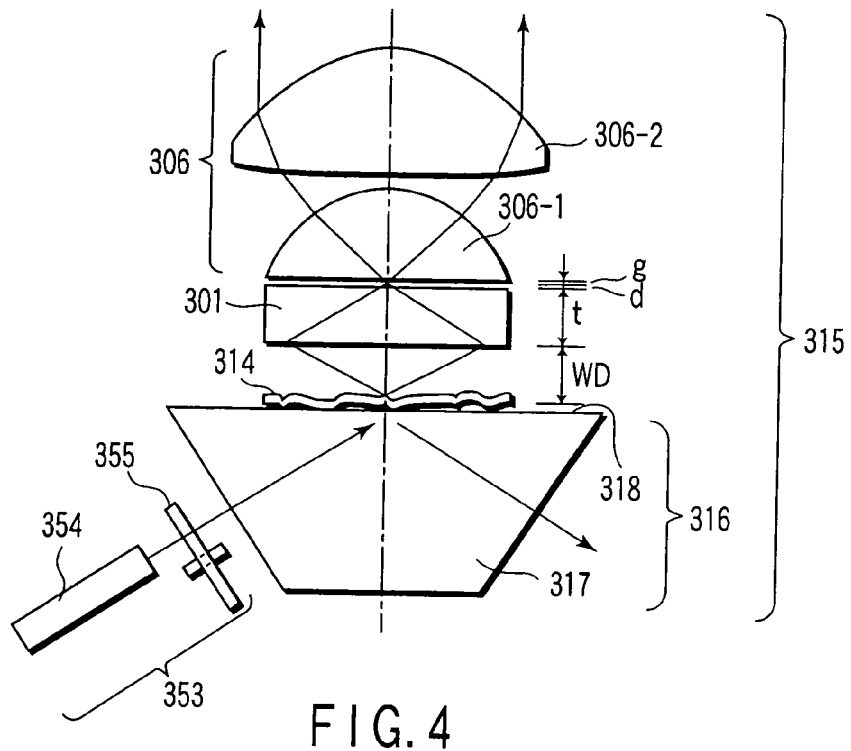
FIG. 4 shows another embodiment of the invention, which is a transmission microscope 315 using the negative index medium 301.

Embodiments of the present invention will now be described in detail with reference to the accompanying drawings. FIG. 1 shows an embodiment of the invention, which is an example of a reflected-light microscope 302 using a negative index medium 301, the components of which are surrounded by air. Light emitted from a light source 303 (e.g. a semiconductor laser) passes through an illumination lens 304 and a semitransparent mirror 305 and enters an objective lens 306. The numerical aperture (NA) of the objective lens 306 exceeds, e.g. 1, and thus it can excite evanescent wave. The objective lens 306 includes optical elements made of a medium with a positive refractive index, for example, lenses 306-1 and 306-2 made of glass. Reference numeral 350 denotes a light source driving circuit for driving the light source 303.

FIG. 2 is an enlarged view of a part in the vicinity of the objective lens 306 shown in FIG. 1. That one of the surfaces of the object lens 306, which is closest to an object (sample) 307, is designated by numeral 311. An intermediate image forming point of the objective lens 306 is represented by FF, and the distance between the surface 311 and the intermediate image forming point FF is represented by g.

The negative index medium 301 that is formed in a plane-parallel plate shape, for instance, is disposed at a distance d from the intermediate image forming point FF. The distance d is defined between the intermediate image forming point FF and an upper surface 310 of the negative index medium 301. The value of the distance d is, e.g. 50 μm. Reference numeral 312 designates an object-side surface of the negative index medium 301.

Light that is scattered by the object 307 travels through the negative index medium 301 and objective lens 306, is reflected by the semitransparent mirror 305, and passes through an eye lens 308. The light coming out from the eye lens 308 can be observed by the eye 309, a TV camera, a cooling CCD camera, etc. This mechanism will be described below in detail.

Assume now that the refractive index of the negative index medium 301 is −1 and the thickness thereof is $\underline{t}$ (e.g. 300 μm). WD (working distance) is a distance between the negative index medium 301 and the object 307 or an imaging member to be described later. The working distance WD will be described later in detail.

Since the refractive index of the negative index medium 301 is −1, the light scattered by the object 307 is refracted in a manner different from usual, as indicated by arrows in FIG. 2 (see non-patent document 2).

From the law of refraction, assuming that the angle of incidence is i and the angle of refraction is r, the following condition is satisfied:

$$r = -i \qquad \text{formula (0-3)}$$

Assuming that the refractive index of the negative index medium 301 is n, the following condition is satisfied:

$$\sin r = (1/n)\sin i \qquad \text{formula (0-4)}$$

According to non-patent document 2, the following condition is satisfied:

$$t = WD + d \qquad \text{formula (1)}$$

In this case, the negative index medium 301 allows an image of the object 307 to be perfectly formed at the intermediate image forming point FF. That is, perfect image forming is achieved. The "perfect image formation", in this context, refers to a state in which all the light as an electromagnetic field, including radiation light and evanescent wave, which is free from the influence of the diffraction limit, is imaged. This state is equivalent to a state in which the object is situated at the point FF.

The value of g is expressed by $$0 \leq g \leq \lambda \qquad \text{formula (0)}$$

and the intermediate image forming point FF is very close to the surface 311. This is a desirable condition for the effective use of the evanescent wave. Practically, in some cases, it may be sufficient to satisfy the following condition:

$$0 \leq g \leq 10\lambda \qquad \text{formula (0-1)}$$

where λ is a wavelength of the light to be used. In the case of visible light, λ is 0.35 μm to 0.7 μm.

In this manner, image formation including the evanescent wave in the case where NA>1.0 can be performed, and this realizes a high-resolution microscope.

Depending on uses, it is possible to use the value of g represented by the following condition:

$$0 \leq g \leq 1000\lambda \qquad \text{formula (0-1-0)}$$

If d=50 μm, WD=250 μm from formula (1). The great length of WD is a merit that has not conventionally been seen. If g is 0 to several-ten nm, the image forming capability is substantially equal to that of a solid immersion lens system in which the objective lens 306 is almost in direct contact with the object 307.

A feature of the embodiment of the present invention resides in that the optical element (e.g. negative index medium 301) made of the negative index medium and the image forming optical system (objective lens 306, etc.) are combined. In the present embodiment, the image forming optical system is disposed on the image side of the negative index medium 301.

The embodiment is also characterized in that the object image (intermediate image) formed by the negative index medium 301 is re-formed by the objective lens 306. In the example of FIG. 2, the intermediate image is a real image. Alternatively, depending on the use of the optical system, the intermediate image may be a virtual image. Further, the example of FIG. 2 is characterized in that illumination light and observation light pass through the negative index medium 301 twice in total in opposite directions.

Although the above description is directed to the case of g≧0, the embodiment is applicable to the following case:

$$g<0 \qquad \text{formula (0-5)}$$

The reason is that if the condition, $$d+g>0 \qquad \text{formula (0-6)}$$

is satisfied, the image formation relationship can be maintained with no contact between the optical elements. The condition, g<0, means that the point FF is positioned within the lens (e.g. lens 306-1). However, if the value of g becomes too small, the condition for perfect image formation could not be satisfied. It is thus preferable that the following condition be satisfied:

$$-t<g<0 \qquad \text{formula (0-7)}$$

Depending on uses of the optical system, it is sufficient to satisfy the following condition:

$$-3t<g<0 \qquad \text{formula (0-8)}$$

Further, depending on the type of the optical system, it may be sufficient, in some cases, to satisfy the following condition:

$$-10t<g<0 \qquad \text{formula (0-9)}$$

Incidentally, d+g=0 may also be permissible.

If a real value is used to represent g, it is preferable to satisfy the following condition:

$$-100 \text{ mm} < g < 0 \qquad \text{formula (0-10)}$$

If the value of g decreases below the lower limit of formula (0-10), it would become difficult to manufacture lenses. It is more preferable to satisfy the following condition:

$$-10 \text{ mm} < g < 0 \qquad \text{formula (0-11)}$$

It is not necessary to strictly satisfy formula (1). The reason is that the image position, which is determined by the negative index medium 301, may shift, in some cases, from the value obtained by formula (1) due to a manufacturing error in the refractive index of the negative index medium 301 or an error in the surface accuracy. That is, it is sufficient to satisfy the following condition:

$$0.5 (WD+d) \leq t \leq 1.5 (WD+d) \qquad \text{formula (2)}$$

Depending on the use condition of the product, it may be sufficient, in some cases, to satisfy the following condition:

$$0.15 (WD+d) \leq t \leq 4.0 (WD+d) \qquad \text{formula (3)}$$

On the other hand, in the case where there is a manufacturing error in the negative index medium 301 and the refractive index deviates from −1, the condition for perfect image formation fails to be satisfied, and the image forming capability of the reflected-light microscope 302 deteriorates.

However, as shown in non-patent document 5, the negative index medium has a chromatic aberration (chromatic dispersion). In other words, if the wavelength of light varies, the refractive index varies.

FIG. 3 shows this phenomenon by a solid line. Even in the case where the refractive index of the negative index medium 301 deviates from −1 due to a manufacturing error, a variation in temperature, etc., the refractive index of the negative index medium 301 can be set at −1 if the wavelength of the light source is varied by varying a parameter 351 for driving the light source of the light source driving apparatus 350 (e.g. an injection current in the case where the light source 303 is a semiconductor laser).

In the example shown in FIG. 3, the refractive index of the negative index medium 301 is −1 when the wavelength of the light source is 410 nm that is a design value. Assume that the refractive index has deviated to −1.05 due to a manufacturing error, a temperature variation, etc. The chromatic dispersion at this time is indicated by a broken line in FIG. 3. In this case, if the driving parameter 351 (e.g. injection current) of the light source driving apparatus 350 is varied to set the wavelength at 405 nm, the refractive index of the negative index medium 301 is restored to −1. Hence, the perfect image formation is realized.

It is preferable, in this case, to eliminate chromatic aberration from the optical system including the illumination lens 304, objective lens 306 and eye lens 308 to a tolerable limit level or less within the range of wavelength variation.

In order to set the refractive index of the negative index medium 301 at −1, the following method may be adopted. The object 307 is replaced with a plate having a pinhole. An image of the pinhole is observed while the parameter 351 for light-source driving is being varied. When the image of the pinhole becomes sharpest, the parameter 351 for light-source driving is fixed.

The concept described above is also applicable to another embodiment of the present invention. Also in another embodiment, the refractive index of the negative index medium 301 is set at, e.g. −1.

FIG. 4 shows another embodiment of the present invention, which is a transmission microscope 315 using the negative index medium 301. FIG. 4 shows, in enlarged scale, only a part in the vicinity of an illuminating optical system 316 and objective lens 306. The components of the transmission microscope 315 are surrounded by air.

Light from a light source 353 enters a prism 317 and reaches a sample (314)-side surface 318 of the prism 317 at an angle of total reflection. The sample 314 is accordingly illuminated by the evanescent wave. The light scattered by the sample 314 is refracted by the negative index medium 301 and perfectly imaged in the vicinity of the intermediate image forming point FF. Thereafter, the light is refocused by the objective lens 306 and is observed.

The above formulae (0), (0-1), (0-3), . . . , (0-11), (1), (2) and (3) are also applicable to this embodiment.

Figure 5:
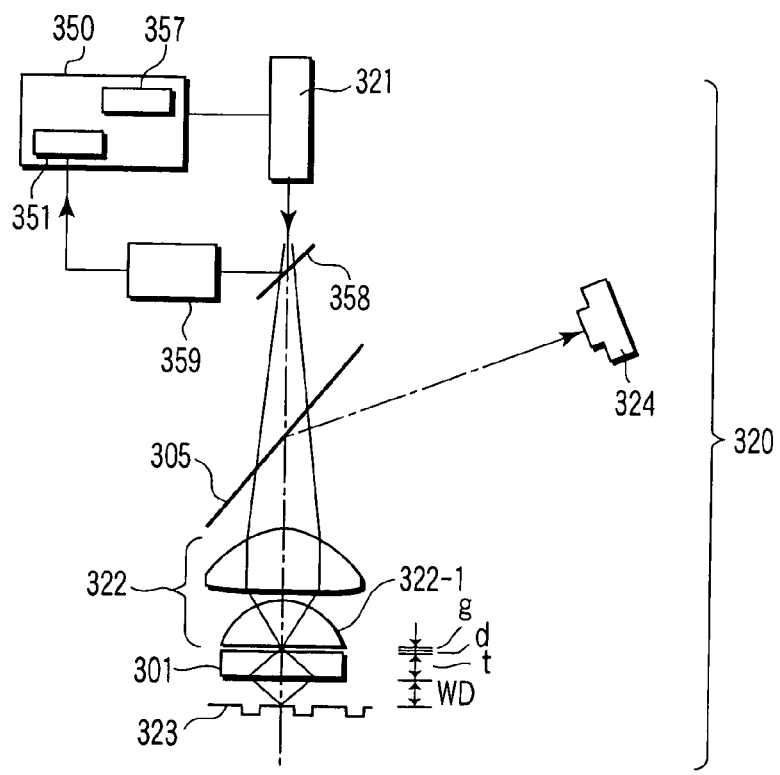
FIG. 5 is a view showing an embodiment of an optical system 320 of an optical disk.
Figure 6:
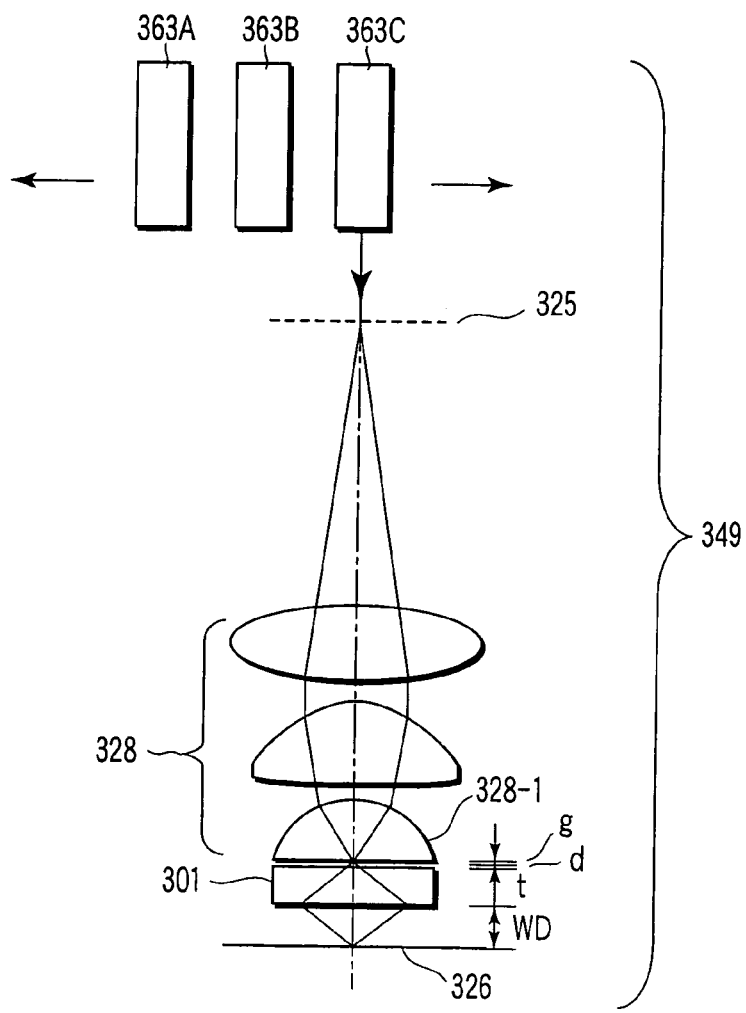
FIG. 6 is a view showing an embodiment of an optical system of a projection exposure apparatus.

In FIG. 4, and FIGS. 5 and 6 (to be described later), the value of d is sufficiently smaller than that of WD and the value of g is near 0. The optical system shown in FIGS. 1 and 4 is applicable to a scanning microscope.

The light source 353 is a light source that is capable of varying the wavelength of emission light. The light source 353 comprises a light source unit 354 and a wavelength-variable filter unit 355. The light source unit 354 is composed of a halogen lamp, a xenon lamp, a mercury lamp, or the like. In order to vary the wavelength of emission light, the spectral transmission characteristics of the wavelength-variable filter unit 355 may be varied.

To achieve this, for example, the wavelength-variable filter unit 355 is composed of a turret having a plurality of filters with different spectral characteristics, and the different filters are configured to be insertable in the optical path. The filters may not be of a transmission type, and may be of a reflection type.

Alternatively, a filter with variable spectral characteristics (also known as "tunable filter") may be used.

As has been described above, since the wavelength of emission light from the light source, or the wavelength range of the emission light, can be varied, it is possible to restore, as in the example of FIGS. 1 and 2, the refractive index of the negative index medium 301 to the design value even if the refractive index varies. Therefore, image formation with higher precision is realized. Natural light (e.g. solar light) is usable as the light source.

FIG. 5 shows an embodiment of an optical system 320 of an optical disk. Light emitted from a semiconductor laser serving as a light source 321 is passed through the semitransparent mirror 305, objective lens 322 and negative index medium 301 and imaged onto an optical disk 323, thereby performing a writing process. The NA of the objective lens 322 exceeds 1, and thus high-density writing can be performed by microscopic spotlight including evanescent light without contacting the objective lens 322 with the optical disk. The optical system 320 is surrounded by air.

The image formation in the negative index medium 301 is performed by the light traveling in the reverse direction to that shown in FIG. 2. In the case of signal reading from the optical disk 323, the light emanating from the light source 321 is scattered by the optical disk 323, passed through the negative index medium 301 and objective lens 322, reflected by the semitransparent mirror 305, and made incident on a photodetector 324. It is possible to perform a reading process with a high-NA lens in a non-contact manner.

In this example, like the example of FIGS. 1 and 2, the light source 321 is driven via the light source driving apparatus 350 by varying the parameter 351 for light-source driving. Thereby, the wavelength of emission light is varied, and it becomes possible to correct a variation in refractive index of the negative index medium 301 or air, and to correct a variation in image formation state of the optical system.

On the other hand, even in the case where the negative index medium 301 is formed to have a refractive index conforming to the design value, the wavelength of emission light may vary due to, e.g. a temperature variation in the light source 321. As a result, the refractive index of the negative index medium 301 may deviate from the design value. Consequently, the condition for perfect image formation fails to be satisfied, and the image formation state deteriorates.

In order to address this problem, it would be better to provide a mechanism 357 in the light source driving mechanism 350, which keeps the wavelength of emission light constant. If a variation in wavelength of emission light due to a temperature variation is to be suppressed, a temperature compensation circuit may be used for the mechanism 357.

Alternatively, such a mechanism may be used as to extract part of the emission light by a half-mirror 358, measure the wavelength by a spectroscope 359, and adjust the parameter 351 for light-source driving.

As a configuration at the time of writing, a photomask 325 is disposed between the light source 321 and objective lens 322, a silicon wafer 326 is disposed in place of the optical disk 323 as shown in FIG. 6, and the photomask 325 and silicon wafer 326 are optically conjugated. With this configuration, a projection exposure apparatus 349 (stepper, etc.) for LSI manufacturing can be obtained. Since the NA exceeds 1 and therefore the evanescent wave can be utilized, high resolution can be obtained. Moreover, non-contact exposure can advantageously be performed. In FIG. 6, the optical system of the projection exposure apparatus 349 is disposed in a vacuum.

The above formulae (0), (0-1), (0-3), . . . , (0-11), (1), (2) and (3) are also applicable to the embodiment of FIGS. 5 and 6.

In this example, light sources 363A, 363B and 363C with different wavelengths are provided. When the refractive index of the negative index medium 301 deviates from the design value, the light sources 363A, 363B and 363C are used to correct such deviation by varying the wavelength of the emission light. Specifically, the light sources 363A, 363B and 363C are successively attached to the optical system 320, and one of the light sources 363A, 363B and 363C, with which an optimal image formation state is obtained, is selected. The selected light source is attached to the apparatus. There is a merit in that the wavelength can be varied to a large degree.

Alternatively, an optical path switching mechanism may be provided in the optical system 320 so as to selectively use the light sources 363A, 363B and 363C.

Figure 7:
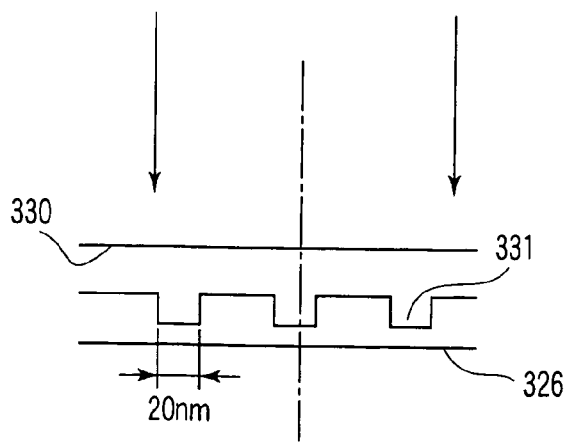
FIG. 7 is a view showing a contact-mode lithography system that is proposed in the prior art.

FIG. 7 is a view showing a contact-mode lithography system that has conventionally been proposed. When an illuminating light is radiated from above onto a transparent polymer photomask 330 having a line width of about 20 nm, evanescent wave is generated below a projection portion 331 to expose a photoresist on the silicon wafer 326. Subsequently, LSI fabrication is started. The polymer photomask 330 is a member having a fine structure. The polymer photomask 330 and silicon wafer 326, however, need to be put in close contact with each other. As a result, at the time of practical use, there arises such a problem that the lifetime of the polymer photomask 330 is short and the polymer photomask 330 is easily damaged. This problem arises even in the case where a chrome photomask is substituted for the polymer photomask.

According to the present invention that has been made in view of the above point, it is possible to realize a high-resolution lithography in a non-contact manner by using the negative index medium 301.

Figure 8:
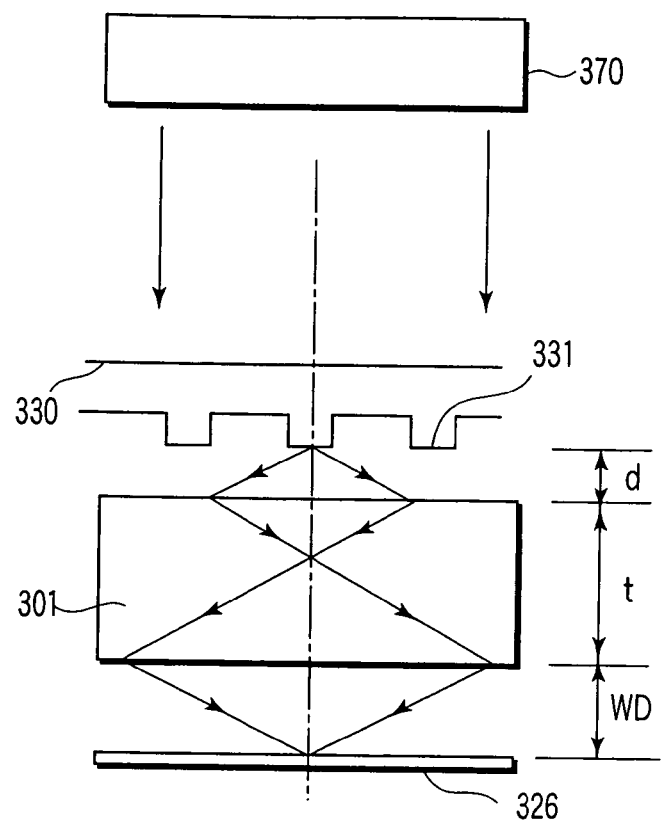
FIG. 8 is a view showing a state in which a plane-parallel plate made of the negative index medium 301 is disposed between a silicon wafer 326 and a polymer photomask 330 such that the plane-parallel plate is put in close contact with, or in close proximity to, the polymer photomask 330.

FIG. 8 is a view for explaining this. As shown in FIG. 8, a plane-parallel plate of the negative index medium 301 is disposed between the silicon wafer 326 and polymer photomask 330 such that the plane-parallel plate is in close contact with, or in close proximity to, the polymer photomask 330. The optical system of FIG. 8 is disposed in a vacuum or in the air.

With this configuration, the evanescent wave generated below the projection portion 331 of the polymer photomask 330 is perfectly imaged onto the silicon wafer 326 by the negative index medium 301 and an image of the photomask 330 is formed on the silicon wafer 326. The imaging magnification is 1. In this manner, it is possible to realize high-resolution lithography with a large WD.

Assuming that the distance between the projection portion 331 and negative index medium 301 is d, the above formulae (1) to (3) are satisfied.

While it is preferable that the NA of the object side of the objective lens 306, the optical disk side of the objective lens 322 and the silicon wafer 326 side of the projection lens 328 be 1.0 or more, a value of less than 1.0 is also permissible. For example, NA of 0.2 or more, or less can be used. The reason is that WD can be extended by the negative index medium 301.

In this example, too, when the refractive index of the negative index medium 301 deviates from the design value, the deviation can be corrected by varying the wavelength of the light source 370. The various methods, which have been described in the above embodiments, are applicable in order to vary the wavelength of the light source 370.

The shape of the negative index medium 301 is not limited to a plane-parallel plate shape in the embodiments of FIGS. 1, 2, 4, 5 and 6.

Figure 9:
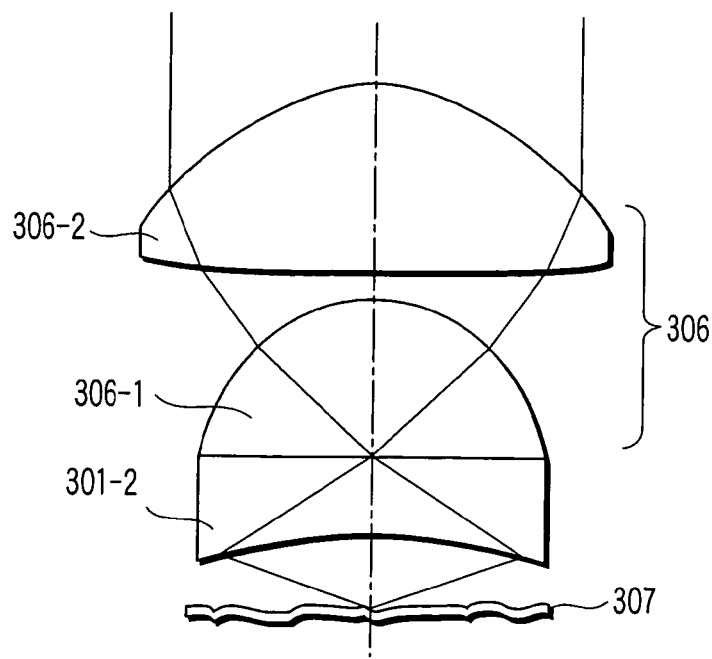
FIG. 9 is a view of an embodiment showing a lens 301-2 that is made of a negative index medium.

As is shown in FIG. 9, it is possible to use, as the negative index medium 301, a lens 301-2 that is made of negative index medium 301 and having a concave surface at the object side. In this case, it is possible to obtain an aberration correction effect as well as to obtain the effect of extending WD. In FIG. 9, the lens 301-2 that is made of negative index medium 301 has a planar surface on one side and a concave surface on the other side. Alternatively, the lens 301-2 may be a biconvex lens, a plane-convex lens, a biconcave lens, a convex meniscus lens, or a concave meniscus lens.

The curved surface of the lens 301-2 that is made of negative index medium 301 may be a spherical surface, an aspherical surface, a free-formed surface, a rotationally asymmetrical surface, or an expanded surface.

Figure 10:
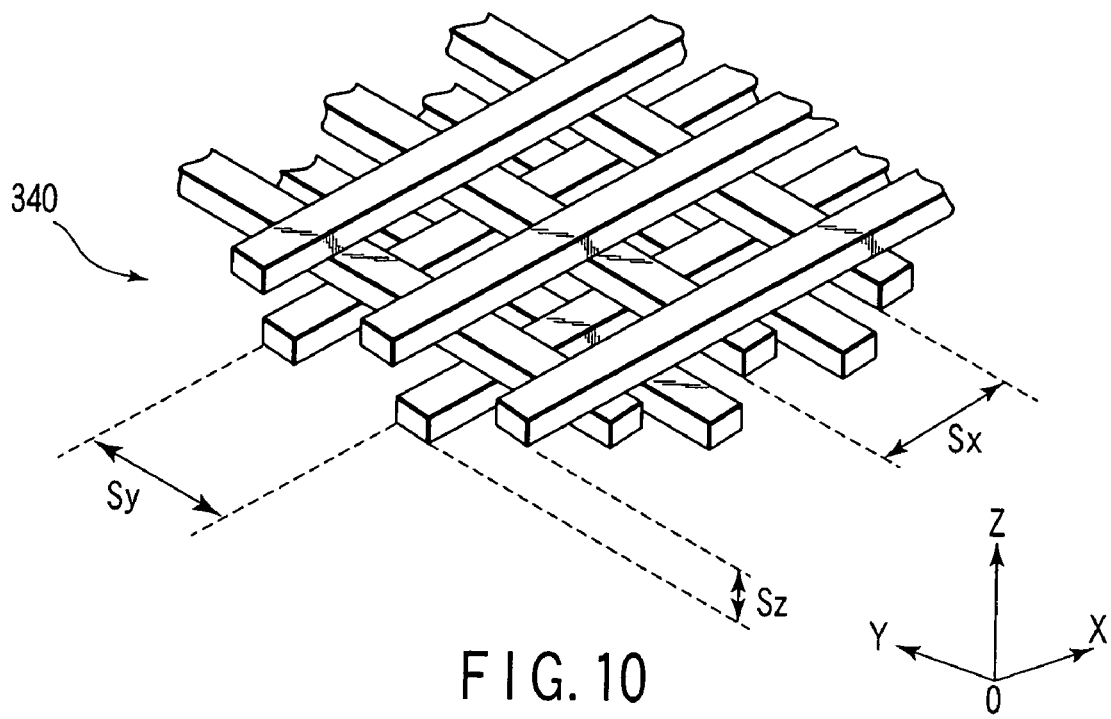
FIG. 10 is a view showing an example of a photonic crystal 340.
Figure 11:
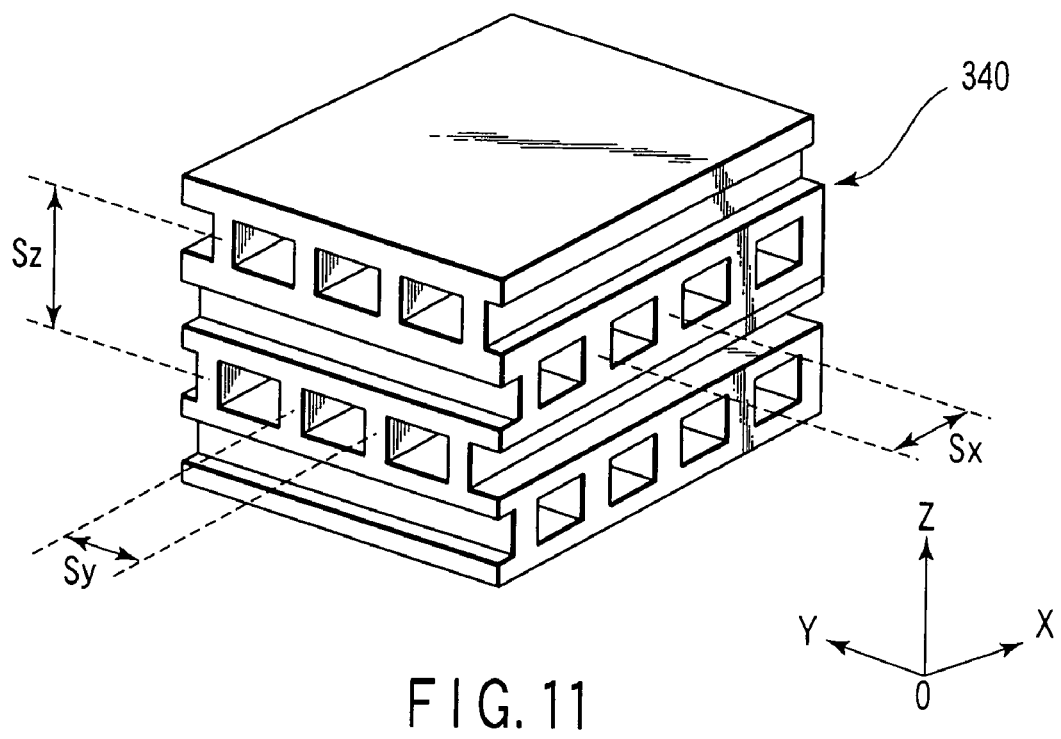
FIG. 11 is a view showing another example of the photonic crystal 340.

Features common to the present invention will be described below. As a specific material of the negative index medium 301, a photonic crystal is usable. FIG. 10 shows a first example of a photonic crystal 340, and FIG. 11 shows a second example of the photonic crystal 340. As is shown in FIGS. 10 and 11, the photonic crystal 340 is a material that has a periodical structure on the scale of $\lambda$ to a several of $\lambda$ and is fabricated by lithography or the like. The material used is a dielectric material including $SiO_2$, synthetic resin such as acrylic resin, polycarbonate, and the like, or GaAs, etc. $\lambda$ is a wavelength of the light to be used. Each of the periods Sx, sy and Sz repeated in X-, Y- and Z-directions in the drawing has a scale of $\lambda$ to a several of $\lambda$. It is known that it is possible to realize a negative refractive index at a portion in the vicinity of the band edge of the photonic crystal (see non-patent document 3). It is preferable that the Z-direction in the drawing be set to the optical axis of the optical system.

The Z-axis is the direction that exhibits optimal rotationally symmetrical characteristics of the photonic crystal.

It is desirable that Sx, Sy and Sz satisfy the following conditions, respectively:

$$\lambda/10 < Sx < \lambda \quad \text{formula (5-1)}$$

$$\lambda/10 < Sy < \lambda \quad \text{formula (5-2)}$$

$$\lambda/10 < Sz < \lambda \quad \text{formula (5-3)}$$

When the values of Sx, Sy and Sz exceed the upper limits, or fall below the lower limits, the photonic crystal is prevented from functioning properly.

Depending on uses, it should suffice if Sx, Sy and Sz satisfy the following conditions:

$$\lambda/30 < Sx < 4\lambda \quad \text{formula (5-4)}$$

$$\lambda/30 < Sy < 4\lambda \quad \text{formula (5-5)}$$

$$\lambda/30 < Sz < 4\lambda \quad \text{formula (5-6)}$$

It is known that when the relative permittivity $\epsilon$ of the negative index medium is −1 and the relative permeability $\mu$ thereof is −1, the refractive index of the medium to a vacuum becomes −1.

As the negative index medium, it is possible to use a material exhibiting negative refraction or a material approximately exhibiting negative refraction, such as a thin film made of silver, gold or copper, or a material exhibiting negative refraction in a specific polarizing direction, or a thin film made of a material having a relative permittivity $\epsilon$ of about −1.

In some cases, the negative index medium is referred to as "left-handed material". In the present invention, negative index medium, left-handed material, material approximately exhibiting negative refraction, material exhibiting negative refraction in a specific polarizing direction, and a thin film made of material having a relative permittivity $\epsilon$ of about −1 are all referred to as medium exhibiting negative refraction. A material exhibiting perfect image formation properties is also included in the medium exhibiting negative refraction. It is preferable to satisfy the following condition in the case of a thin film made of the material having a relative permittivity $\epsilon$ of about −1:

$$-1.2 < \epsilon < -0.8 \quad \text{formula (5-7)}$$

Depending on uses, it is sufficient to satisfy the following condition:

$$-1.6 < \epsilon < -0.5 \quad \text{formula (5-8)}$$

As a wavelength of the light to be used, monochromatic light is used in the above embodiments. Alternatively, it is possible to use a low-coherence light source such as a light source emitting a continuous spectrum, a white light source, a sum of monochromatic lights, or a superluminescent diode.

In view of transmission performance in air and availability of a light source, it is preferable to use a wavelength of 0.1 μm to 3 μm. It is preferable to use a visible light in view of ease of use.

Electromagnetic waves with wavelengths of 0.1 mm to 1000 mm may be used since the photonic crystal can easily be fabricated.

A detailed description will be given below of the WD.

It is preferable that the value of WD satisfy the following condition:

$$100 \text{ nm} \leq WD \leq 20 \text{ mm} \quad \text{formula (7)}$$

When the value of WD falls below the lower limit of the formula (7), the working distance is excessively reduced and the ease of use is lost. On the other hand, when the value of WD exceeds the upper limit of the formula (7), the size of the negative index medium is increased too much, resulting in a disadvantage with regard to cost and manufacturing efficiency. Further, the size of the entire optical apparatus is increased too much.

Depending on the product type, the value of WD satisfying the following condition is permissible:

$$20 \text{ nm} \leq WD \leq 200 \text{ mm} \quad \text{formula (8)}$$

It is desirable to satisfy the following condition:

$$WD > d \quad \text{formula (8-1)}$$

The reason is that when the value of t is the same, the smaller the value of d, the greater the value of WD can be, according to formula (1).

Depending on the product type, the value of WD satisfying the following condition is permissible:

$$WD > 0.1d \qquad \text{formula (8-2)}$$

In this case, it is possible to reduce the size of the lenses 306, 322, 328, and the like by reducing the value of d.

It is desirable for the value of d to satisfy the following condition in order to increase the resolution:

$$d \geq 0 \qquad \text{formula (8-2-1)}$$

Depending on uses, it is sufficient to satisfy the following condition:

$$d < 0 \qquad \text{formula (8-2-2)}$$

Further, it is desirable that the value of WD be made variable, for example, by devising the mechanical structure of the optical apparatus. A stage of the microscope is an example thereof.

The negative index medium 301 and the lens surface closest to the negative index medium 301 (surface 311 in the case of FIG. 2) may be attached to each other by means of an adhesive. Alternatively, the lens (306-1 in the case of FIG. 4) may be used as a substrate and the negative index medium 301 may be formed on the lens. In the above cases, the value of d is approximately 0, or is 0.

Alternatively, the configuration is allowable in which the negative index medium 301 is formed on a transparent flat plate and the transparent flat plate is so disposed as to constitute a part of the lens that is to be used for image formation. It is preferable that the transparent flat plate be disposed at the foremost part (object side of the lens 306-1 in the case of FIG. 1) of the image forming lens system (objective lens 306 in the case of FIG. 1) or at the rearmost part thereof (wafer side of the projection lens 328 in the case of FIG. 6). It is preferable that the lens or transparent flat plate, which is to be used as a substrate, be made of a material with a positive refractive index. In this case, the lens or flat plate can be manufactured at low cost. The value of WD or d is measured from the surface of the negative index medium 301 even in the case where the negative index medium 301 is formed on the substrate.

FIG. 12 shows an example of a reflected-light microscope 302 using a negative index medium 301 that is formed on a flat plate 450 made of a material with a positive refractive index. The flat plate 450 and lenses 306-1 and 306-2 are combined to form the objective lens 306. The intermediate image forming point FF slightly enters the flat plate 450. The lens 306-1 and flat plate 450 are bonded to each other. Formulae (12) and (13), which are to be described later, are applicable to the refractive index of the flat plate 450.

The optical system having the above configuration is applicable to the examples shown in FIGS. 4, 5, 6 and 8.

As regards the deviation from formula (1) that specifies the condition for perfect image formation, assuming that $$WD + d - t = \Delta \qquad \text{formula (8-3)}$$

is satisfied, the greater the value of $|\Delta|$, the worse the image forming state becomes.

When the following condition is satisfied, it is possible to limit the degradation of image forming state to a certain level:

$$|\Delta| < \lambda \qquad \text{formula (8-4)}$$

For practical use, it is sufficient for the value of $|\Delta|$ to satisfy the following condition depending on the product type:

$$|\Delta| < 10\lambda \qquad \text{formula (8-5)}$$

Assuming that the refractive index of the negative index medium 301 is n, the condition, n<0, is satisfied, whereas n=−1 is satisfied in the embodiment described above. When the negative index medium 301 is a plane-parallel plate, it is ideally desirable that the condition, n=−1, be satisfied. Actually, however, it may be impossible, in some cases, to satisfy n=−1 due to a manufacturing error in the negative index medium 301 or a difference in wavelengths used. In this case, it is desirable to satisfy the following formula:

$$-1.1 < n < -0.9 \qquad \text{formula (9)}$$

When the value of n becomes out of the above range, the condition for perfect image formation fails to be satisfied and the resolution decreases. Depending on the product type, it is sufficient to satisfy the following condition:

$$-1.5 < n < -0.5 \qquad \text{formula (10)}$$

Only for the purpose of widely setting the WD, it is sufficient for the value of n to satisfy the following condition in some cases:

$$-3 < n < -0.2 \qquad \text{formula (11)}$$

Assume that the refractive index of the lens nearest to the negative index medium (306-1, 332-1 and 328-1 in the cases of FIGS. 1, 5 and 6, respectively) is N. In this case, the greater the value of N, the higher the resolution becomes.

When the following condition is satisfied, the range of applications of the optical apparatus is increased:

$$N \geq 1.3 \qquad \text{formula (12)}$$

It is more preferable to satisfy the following condition:

$$N \geq 1.7 \qquad \text{formula (13)}$$

Note that the negative index medium 301 is assumed to be surrounded by air or vacuum in all the embodiments of the present invention. Thus, the refractive index n of the negative index medium 301 represents the relative refractive index with respect to air in the case where the negative index medium 301 is surrounded by air, and represents the relative refractive index with respect to vacuum in the case where the negative index medium 301 is surrounded by vacuum. In the case where the negative index medium 301 is surrounded by vacuum, short-wavelength vacuum ultraviolet radiation is usable. Further, no decrease occurs in the resolution due to air fluctuation. As a result, satisfactory image forming capability can be obtained. In the case where the negative index medium 301 is surrounded by air, the optical apparatus can easily be manufactured and handled. The configuration is allowable in which only the optical path in the region around the negative index medium 301 is enclosed in a vacuum and the residual parts of the optical apparatus are surrounded by air.

In this specification, both air and vacuum are referred to as "surrounding medium".

It is thus possible to obtain an optical apparatus that is easy to handle and has an excellent image forming capability.

Assuming that the refractive index of the negative index medium 301 with respect to vacuum is nv and the refractive index of air with respect to vacuum is nA, nA=1.0002818, where the air pressure is 1 atm and wavelength is 500 nm.

The required condition for obtaining ideal perfect image formation in the case where the optical apparatus is surrounded by air is as follows:

$$nv = -nA \quad \text{formula (15)}$$

The required condition for obtaining ideal perfect image formation in the case where the optical apparatus is surrounded by vacuum is as follows:

$$nv = -1.0 \quad \text{formula (16)}$$

If the air pressure varies, the refractive index of air varies accordingly. Hence, even in the case where the refractive index of the negative index medium 301 is unchanged, the condition of formula (15) may vary.

Consequently, the image formation state of the optical system deteriorates. In this case, in order to satisfy the formula (15) by varying the refractive index of the negative index medium 301, it is possible to use the above-described various methods for varying the wavelength of light used.

These methods are applicable to optical systems including the optical element made of the negative index medium, for example, to a low-precision optical system such as an optical system that makes no use of the effect of perfect image formation.

In the example of FIGS. 1 and 2, a medium such as air or oil may be filled between the elements 301 and 317. In the present specification, these mediums are also referred to as "surrounding medium". For example, if oil is filled between the elements 301 and 304 and the refractive index thereof is nc (e.g. 1.5), it is desirable that the refractive index of the medium 301 be −nc (−1.5), because this is one of required conditions for perfect image formation. A tolerable range of an error of nc, −nc is between about ±10% and about ±50%, depending on the purpose of use and application. In some cases, the tolerable range may be ±80%.

Even in the case where the refractive index of oil, water, etc. varies due to a temperature variation, etc., degradation in image forming capability can be corrected by varying the wavelength of light used, making use of the above-described various methods. Furthermore, it is possible to correct a variation in refractive index of the surrounding medium such as oil or water.

The term "perfect image formation" used in the present specification includes the case where 100% perfect image formation is not achieved, for example, the case where the resolution is increased by 50%. That is, perfect image formation in the present specification also includes the case where, for example, the resolution is increased to some extent relative to normal diffraction limit.

The term "light" in this specification includes electromagnetic waves.

According to the present invention, it is possible to realize an optical apparatus having various optical systems with satisfactory optical capability, the optical systems having a long length of WD or being configured to be non-contact type.

Finally, the definitions of the technical terms used in the embodiments will be described.

The optical apparatus denotes an apparatus including an optical system or optical element. The optical apparatus need not function as a single unit. That is, the optical apparatus may be a part of an apparatus.

The optical apparatus includes an image pickup apparatus, an observation apparatus, a display apparatus, an illumination apparatus, a signal processing apparatus, an optical information processing apparatus, a projection apparatus, a projection exposure apparatus, and the like.

Examples of the image pickup apparatus include a film camera, digital camera, PDA digital camera, robot's eye, single-lens reflex camera with interchangeable lenses, TV camera, video recording apparatus, electronic video recording apparatus, camcorder, VTR camera, mobile phone digital camera, mobile phone TV camera, electronic endoscope, capsule endoscope, car-mounted camera, satellite-mounted camera, camera mounted on planetary probe, camera mounted on space probe, camera in monitoring system, eye of various sensors, digital camera mounted on recording apparatus, machine vision, laser scanning type microscope, projection exposure apparatus, stepper, aligner, optical probe microscope, and the like. The digital camera, card type digital camera, TV camera, VTR camera, video recording camera, mobile phone digital camera, mobile phone TV camera, car-mounted camera, satellite-mounted camera, camera mounted on planetary probe, camera mounted on space probe, digital camera mounted on recording apparatus are all examples of the electronic image pickup apparatus.

Examples of the observation apparatus include a microscope, telescope, eyeglasses, binocular telescope, loupe, fiber scope, finder, viewfinder, contact lens, intraocular lens, machine vision, and the like.

Examples of the display apparatus include a liquid crystal display, viewfinder, game console ("Play Station" manufactured by SONY Corp.), video projector, liquid crystal projector, head mounted display (HMD), personal digital assistant (PDA), mobile phone, machine vision, and the like.

The video projector, liquid crystal projector, and the like are included in the group of projection apparatus.

Examples of the illumination apparatus include a flash light of a camera, car headlight, endoscope light source, microscope light source and the like.

Examples of the signal processing apparatus include a mobile phone, personal computer, game console, optical disk reading/writing apparatus, computation apparatus of optical calculator, optical interconnection apparatus, optical information processing apparatus, optical LSI, optical computer, PDA, and the like.

An information transmission apparatus denotes an apparatus that can input and transmit some sort of information. Examples of the information transmission apparatus include a mobile phone, fixed telephone, game console, television remote controller, radio cassette player remote controller, stereo remote controller, personal computer, personal computer keyboard, personal computer mouse, personal computer touch panel, and the like.

A TV monitor, PC monitor, display with image pickup apparatus are also included in the information transmission apparatus.

The information transmission apparatus is included in the group of signal processing apparatus.

Examples of the image pickup apparatus include a CCD, image pickup tube, solid-state image pickup element, photographic film, and the like. The plane-parallel plate is one of prisms. A change of an observer includes a change in diopter. A change of an object includes a change in object distance, the displacement of the object, the movement of the object, vibration or the shake of the object. The image pickup element, wafer, optical disk, silver halide film and the like are examples of an image forming member.

An extended curved surface is defined as follows:

Any shape such as a spherical, planar, or rotationally symmetrical aspherical surface; a spherical, planar, or rotationally symmetrical aspherical surface which is decentered with respect to the optical axis; an aspherical surface with plane of symmetry; an aspherical surface with only one plane of symmetry; an aspherical surface with no plane of symmetry; a free-formed surface; a surface with a non-differentiable point or line; etc. is satisfactory. Moreover, any surface which has some effect on light, such as a reflecting or refracting surface, is satisfactory.

In the present invention, it is assumed that such surfaces are generally referred to as "extended curved surface".

The image forming optical system denotes an image pickup optical system, observation optical system, projection optical system, projection exposure optical system, display optical system, optical system for signal processing, and the like.

An example of the image pickup optical system is an image pickup lens of the digital camera.

Examples of the observation optical system include a microscope optical system, telescope optical system, and the like.

Examples of the projection optical system include an optical system of a video projector, optical system for lithography, optical system for reading/writing a signal from/on an optical disk, optical system of an optical pickup, and the like.

An example of the projection exposure optical system is an optical system for lithography.

An example of the display optical system is an optical system of a viewfinder provided in a video camera.

Examples of the optical system for signal processing include an optical system for reading/writing a signal from/on an optical disk, optical system of an optical pickup, and the like.

The optical element denotes a lens, aspherical lens, mirror, prism, free-form surface-prism, diffractive optical element (DOE), inhomogeneous lens, and the like. The plane-parallel plate is one of the optical elements.

(Additional Descriptions)

1. An optical apparatus comprising:
an optical element that is made of a medium exhibiting negative refraction; and
correction means for varying a wavelength of light used, thereby correcting a variation in image forming capability, which occurs due to one of a variation in refractive index of the optical element and a variation in refractive index of a surrounding medium.

1-1. An optical apparatus comprising:
a light source;
an optical element that is made of a medium exhibiting negative refraction; and
correction means for varying a wavelength of light used, and thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

2. An optical apparatus comprising:
a light source with a variable wavelength;
an optical element that is made of a medium exhibiting negative refraction; and
correction means for varying a wavelength of emission light from the light source and thus correcting one of a variation in refractive index of the optical element and a variation in refractive index of a surrounding medium, thereby correcting a variation in image forming capability due to one of the variation in refractive index of the optical element and the variation in refractive index of the surrounding medium.

2-1. An optical apparatus comprising:
a light source with a variable wavelength;
an optical element that is made of a medium exhibiting negative refraction; and
correction means for varying a wavelength of emission light from the light source and thus correcting one of a variation in refractive index of the optical element and a variation in refractive index of a surrounding medium, thereby correcting a variation in image forming capability due to one of the variation in refractive index of the optical element and the variation in refractive index of the surrounding medium.

2-2. The optical apparatus according to 2 or 2-1, further comprising a light source driving apparatus that drives the light source.

2-3. The optical apparatus according to 2-2, wherein the correction means varies a driving parameter of the light source driving apparatus and varies the wavelength of the emission light from the light source, and thus corrects one of a variation in refractive index of the optical element and a variation in refractive index of the surrounding medium, thereby correcting a variation in image forming capability due to one of the variation in refractive index of the optical element and the variation in refractive index of the surrounding medium.

2-4. The optical apparatus according to 2 or 2-1, wherein the light source with a variable length is constructed by making variable a spectral transmittance of a filter that is disposed in an optical path.

2-5. An optical apparatus comprising:
an optical element that is made of a medium exhibiting negative refraction; and
correction means for varying a spectral transmittance of a filter that is disposed in an optical path, and varying a wavelength of light used, and thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

2-6. An optical apparatus comprising:
an optical element that is made of a medium exhibiting negative refraction; and
correction means for varying a spectral transmittance of a filter that is disposed in an optical path, and varying a wavelength of light used, thereby correcting a variation in image forming capability, which occurs due to one of a variation in refractive index of the optical element and a variation in refractive index of a surrounding medium.

3. An optical apparatus comprising:
a light source;
an optical element that is made of a medium exhibiting negative refraction; and
a control mechanism that limits a wavelength of emission light from the light source within a predetermined tolerable range, thereby suppressing a variation in image forming capability due to a variation in wavelength of the emission light from the light source.

3-1. The optical apparatus according to 3, further comprising a light source driving apparatus that drives the light source.

4. An optical apparatus comprising:
a light source;
an optical element that is made of a medium exhibiting negative refraction; and
correction means for varying a wavelength of emission light from the light source by replacing the light source, and thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

4-1. An optical apparatus comprising:
a light source;
an optical element that is made of a medium exhibiting negative refraction; and
correction means for varying a wavelength of emission light from the light source by replacing the light source, and thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

4-2. The optical apparatus according to any one of 1 through 4-1, further comprising an optical system including the optical element.

4-3. The optical apparatus according to any one of 1 through 4-1, further comprising an optical system including said optical element and an optical element other than said optical element.

4-4. The optical apparatus according to any one of 1 through 4-1, further comprising an optical system in which the optical element and an image forming optical element are combined and disposed.

4-5. The optical apparatus according to any one of 1 through 4-4, wherein the optical element is a plane-parallel plate.

5. The optical apparatus according to any one of 1 through 4-4, further comprising a member with a fine structure, wherein the fine structure is imaged.

5-1. The optical apparatus according to any one of 1 through 4-4, wherein the light source, a member with a fine structure, and the optical element are successively disposed, and the fine structure is imaged.

5-2. The optical apparatus according to any one of 4-2 through 5-1, wherein chromatic aberration of the optical system is eliminated within a range of a variation in wavelength of light used.

5-3. The optical apparatus according to any one of 1 through 5-2, wherein the refractive index n of the optical element satisfies the following condition:

$$-3 < n < -0.2 \quad \text{formula (11)}$$

where n is a refractive index of the negative index medium.

5-4. The optical apparatus according to any one of 1 to 5-2, wherein the optical element is surrounded by air.

5-5. The optical apparatus according to any one of 1 to 5-2, wherein the optical element is surrounded by vacuum.

6. The optical apparatus according to any one of 1 through 5-5, wherein a photonic crystal is used as the medium exhibiting negative refraction.

6-1. The optical apparatus according to any one of 1 through 5-5, wherein the light used is monochromatic light.

6-2. The optical apparatus according to any one of 1 through 5-5, wherein the light used has a wavelength of between 0.1 µm and 3 µm.

6-3. The optical apparatus according to any one of 1 through 5-5, wherein evanescent wave is used for image formation.

6-4. The optical apparatus according to any one of 1 through 5-5, wherein a distance between the optical element, and an object or an image forming member is variable.

6-5. The optical apparatus according to any one of 1 through 5-5, wherein the medium exhibiting negative refraction is a negative index medium.

6-6. The optical apparatus according to any one of 1 through 5-5, wherein the medium exhibiting negative refraction is a medium that exhibits perfect image formation properties.

7. A lens made of a medium exhibiting negative refraction.

7-1. A lens made of a medium exhibiting negative refraction, wherein one side of the lens has a plane surface.

7-2. A biconcave or biconvex lens made of a medium exhibiting negative refraction.

7-3. A meniscus lens made of a medium exhibiting negative refraction.

7-4. A lens made of a medium exhibiting negative refraction, wherein the lens has an aspherical surface.

7-5. A lens made of a medium exhibiting negative refraction, wherein the lens has a rotationally asymmetrical surface.

7-6. A lens made of a medium exhibiting negative refraction, wherein the lens has an extended curved surface.

7-7. A lens including an optical element made of a material exhibiting a positive refractive index, and a medium exhibiting negative refraction formed on the optical element serving as a substrate.

7-8. An optical element including an optical element made of a material exhibiting a positive refractive index, and a medium exhibiting negative refraction formed on the optical element serving as a substrate.

7-9. An optical element including a transparent flat plate, and a medium exhibiting negative refraction formed on the flat plate serving as a substrate.

7-10. An optical element including a transparent flat plate made of a material exhibiting a positive refractive index, and a medium exhibiting negative refraction formed on the flat plate serving as a substrate.

8. An optical system having an optical element made of a medium exhibiting negative refraction.

9. An optical system having an optical element made of a medium exhibiting negative refraction, and an optical element other than the aforementioned optical element.

9-1. An optical system having an optical element made of a medium exhibiting negative refraction, and an optical element made of a medium exhibiting a positive refractive index.

9-1-1. An optical system having an optical element made of a medium exhibiting negative refraction, and an optical element made of a medium exhibiting a positive refractive index, wherein a gap is provided between the optical element made of a medium exhibiting a positive refractive index, which is nearest to the optical element made of a medium exhibiting negative refraction, and the optical element made of a medium exhibiting negative refraction.

10. An optical system in which an optical element made of a medium exhibiting negative refraction and an image forming optical system are combined and disposed.

10-0. An optical system having an image formation relationship achieved by an optical element made of a medium exhibiting negative refraction, and having an optical element, other than the optical element made of a medium exhibiting negative refraction.

10-1. An optical system having an image formation relationship achieved by an optical element made of a medium exhibiting negative refraction, and an image formation relationship achieved by an image forming optical system.

10-2. An optical system wherein an image of an object is formed by an optical element made of a medium exhibiting negative refraction, and the image is re-formed by an image forming optical system.

10-3. An optical system wherein an image of an object is formed by an image forming optical system, and the image is re-formed by an optical element made of a medium exhibiting negative refraction.

10-4. The optical system according to any one of 8 through 10-3, wherein an object has a two- or three-dimensional shape.

10-5. The optical system according to any one of 8 through 10-4, wherein light passes through the medium exhibiting negative refraction two times.

10-10. The optical system according to any one of 8 through 10-5, wherein the optical element is a plane-parallel plate.

10-11. The optical system according to any one of 8 through 10-10, wherein the following formula (0-1-0) or formula (0-5) is satisfied, $$0 \leq g \leq 1000\lambda \qquad \text{formula (0-1-0)}$$

$$g < 0 \qquad \text{formula (0-5)}$$

where g is a distance between a surface of an objective lens, which is nearest to an object, and an intermediate image forming point, and λ is a wavelength of light.

10-12. The optical system according to any one of 8 through 10-11, wherein the following formula (3) is satisfied, $$0.15\,(WD+d) \leq t \leq 4.0\,(WD+d) \qquad \text{formula (3)}$$

where WD is a distance between the optical element, and an object or an image plane, d is a distance between the optical element and an intermediate image forming point of the optical system, and t is the thickness of the optical element.

10-13. The optical system according to any one of 8 through 10-12, wherein the refractive index of the optical element is about −1.

10-14. The optical system according to any one of 8 through 10-12, wherein the refractive index of the optical element satisfies the following formula (11), $$-3 < n < -0.2 \qquad \text{formula (11)}$$

where n is the refractive index of the negative index medium.

10-15. The optical system according to any one of 8 through 10-14, wherein an NA (Numerical Aperture) of the optical system on the object side, the image side, or at an intermediate image forming point exceeds 0.2.

10-16. The optical system according to any one of 8 through 10-14, wherein an NA (Numerical Aperture) of the optical system on the object side, the image side, or at an intermediate image forming point is less than 1.0.

10-17. The optical system according to any one of 8 through 10-14, wherein an NA (Numerical Aperture) of the optical system on the object side, the image side, or at an intermediate image forming point is 1.0 or more.

10-18. The optical system according to any one of 8 through 10-17, wherein a distance between the optical system, and an object or an image plane satisfies the following formula (8), $$20\text{ nm} \leq WD \leq 200\text{ mm} \qquad \text{formula (8)}$$

where WD is the distance between the optical element, and an object or an image plane.

10-19. The optical system according to any one of 8 through 10-18, wherein the following formula (8-2) is satisfied, $$WD > 0.1d \qquad \text{formula (8-2)}$$

where WD is the distance between the optical element, and an object or an image plane, and d is the distance between the optical element and an intermediate image forming point of the optical system.

10-20. The optical system according to any one of 8 through 10-19, wherein the following formula (8-5) is satisfied, $$|\Delta| < 10\lambda \qquad \text{formula (8-5)}$$

where Δ=WD+d−t, and

λ is the wavelength of light,

WD is the distance between the optical element and an object or an image plane, and t is the thickness of the optical element.

10-21. The optical system according to any one of 8 through 10-20, wherein an image forming optical system is disposed on a rear side of the optical element.

10-22. An optical apparatus having the optical system according to 10-21.

10-23. A microscope having the optical system according to 10-21.

10-24. A reflected-light microscope having the optical system according to 10-21.

10-25. A transmission microscope having the optical system according to 10-21.

10-26. An observation apparatus having the optical system according to 10-21.

10-27. An image pickup apparatus having the optical system according to 10-21.

10-27-1. A scanning microscope having the optical system according to 10-21.

10-28. The optical system according to any one of 8 through 10-20, wherein an image forming optical system is disposed on a front side of the optical element.

10-29. An optical apparatus having the optical system according to 10-28.

10-30. An optical disk apparatus having the optical system according to 10-28.

10-31. A projection exposure apparatus having the optical system according to 10-28.

10-32. A projection apparatus having the optical system according to 10-28.

10-33. A signal processing apparatus having the optical system according to 10-28.

10-34. An image pickup apparatus having the optical system according to 10-28.

10-35. An optical apparatus including any one of the optical systems according to 8 to 10-20.

10-36. A structure according to any one of 8 through 10-35, wherein the following formula (12) is satisfied, $$N \geq 1.3 \qquad \text{formula (12)}$$

where N is a refractive index of a lens nearest to the negative index medium.

10-37. A structure according to any one of 8 through 10-35, wherein the optical element made of a medium exhibiting negative refraction has the structure according to any one of 7 through 7-10.

10-38. A structure according to any one of 8 through 10-36, including the lens or the optical element according to 7-7 through 7-10, wherein the substrate constitutes a part of the image forming optical system or the optical system.

10-39. A structure according to any one of 8 through 10-36, including the lens or the optical element according to 7-7 through 7-10, wherein the substrate constitutes a part of the image forming optical system or the optical system, and the substrate is disposed opposed to the object with respect to the medium exhibiting negative refraction.

10-39-1. A structure according to any one of 8 through 10-36, including the lens or the optical element according to 7-7 through 7-10, wherein the substrate constitutes a part of the image forming optical system or the optical system, and the substrate is bonded to the optical element that constitutes the image forming optical system.

10-39-2. A structure according to any one of 9 through 10-36, wherein the medium exhibiting negative refraction is bonded to the optical element constituting the optical system.

10-40. A structure according to 10-38, wherein the refractive index of the substrate satisfies the following formula (12), $$N \geq 1.3 \qquad \text{formula (12)}$$

where N is a refractive index of a lens nearest to the negative index medium.

10-41-1. An image forming optical system having an optical element made of a medium exhibiting negative refraction.

10-41-2. An image forming optical system having an optical element made of a medium exhibiting negative refraction, and an optical element other than the aforementioned optical element.

10-41-3. An image forming optical system having an optical element made of a medium exhibiting negative refraction, and an optical element made of a medium exhibiting a positive refractive index.

10-42-1. An image pickup optical system having an optical element made of a medium exhibiting negative refraction.

10-42-2. An image pickup optical system having an optical element made of a medium exhibiting negative refraction, and an optical element other than the aforementioned optical element.

10-42-3. An image pickup optical system having an optical element made of a medium exhibiting negative refraction, and an optical element made of a medium exhibiting a positive refractive index.

10-43-1. An observation optical system having an optical element made of a medium exhibiting negative refraction.

10-43-2. An observation optical system having an optical element made of a medium exhibiting negative refraction, and an optical element other than the aforementioned optical element.

10-43-3. An observation optical system having an optical element made of a medium exhibiting negative refraction, and an optical element made of a medium exhibiting a positive refractive index.

10-44-1. A signal processing optical system having an optical element made of a medium exhibiting negative refraction.

10-44-2. A signal processing optical system having an optical element made of a medium exhibiting negative refraction, and an optical element other than the aforementioned optical element.

10-44-3. A signal processing optical system having an optical element made of a medium exhibiting negative refraction, and an optical element made of a medium exhibiting a positive refractive index.

11. An optical apparatus including a light source, a member with a fine structure, and an optical element made of a medium exhibiting negative refraction, wherein the fine structure is imaged.

11-0-1. An optical apparatus wherein a light source, a member with a fine structure, and an optical element made of a medium exhibiting negative refraction are successively disposed, and the fine structure is imaged.

11-1. An exposure apparatus wherein a light source, a photomask, and an optical element made of a medium exhibiting negative refraction are successively disposed, and the wafer is subjected to exposure.

11-2. The optical apparatus according to 11 or 11-1, wherein the optical element is a plane-parallel plate.

11-3. The optical apparatus according to 11-2, wherein the following formula (3) is satisfied, $$0.15 \, (WD+d) \leq t \leq 4.0 \, (WD+d) \qquad \text{formula (3)}$$

where WD is a distance between the optical element, and an image plane or a wafer, d is a distance between the optical element and a member with a fine structure or a photomask, and t is the thickness of the optical element.

11-4. The optical apparatus according to any one of 11 through 11-3, wherein the refractive index of the optical element is about −1.

11-5. The optical apparatus according to any one of 11 through 11-3, wherein the refractive index of the optical element satisfies the following formula (11), $$-3 < n < -0.2 \qquad \text{formula (11)}$$

where n is the refractive index of the negative index medium.

11-6. The optical apparatus according to any one of 11 through 11-5, wherein a distance between the optical element and an image plane satisfies the following formula (8), $$20 \, \text{nm} \leq WD \leq 200 \, \text{mm} \qquad \text{formula (8)}$$

where WD is the distance between the optical element, and an image plane or a wafer.

11-7. The optical apparatus according to any one of 11 through 11-6, wherein the following formula (8-2) is satisfied, $$WD > 0.1d \qquad \text{formula (8-2)}$$

where WD is the distance between the optical element, and an image plane or a wafer, and d is the distance between an intermediate image forming point and the negative index medium.

11-8. The optical apparatus according to any one of 11 through 11-7, wherein the optical apparatus satisfies formula (8-5).

11-8-1. A structure according to any one of 11 through 11-7, wherein the optical element made of a medium exhibiting negative refraction has the structure according to any one of 7-8 through 7-10.

11-9. The optical apparatus according to any one of 7 through 11-8-1, wherein a photonic crystal is used as the medium exhibiting negative refraction.

11-9-1. A structure according to any one of 7 through 11-8-1, wherein a photonic crystal is used as the medium exhibiting negative refraction, and a Z-axis of the photonic crystal agrees with an optical-axis direction of the optical element or optical system.

11-10. The optical apparatus according to 11-9, wherein the following formulae are satisfied, $$\lambda/30 < Sx < 4\lambda \qquad \text{formula (5-4), or}$$

$$\lambda/30 < Sy < 4\lambda \qquad \text{formula (5-5), or}$$

$$\lambda/30 < Sz < 4\lambda \qquad \text{formula (5-6)}$$

where λ is the wavelength of light, and

Sx, Sy and Sz are repetitive cycles of the photonic crystal in X, Y and Z directions.

11-11. The optical apparatus according to any one of 7 through 11-10, wherein the light used is monochromatic light.

11-12. A structure according to any one of 7 through 11-9, wherein the light used has a wavelength of between 0.1 μm and 3 μm.

11-12-1. A structure according to any one of 7 through 11-10, having a light source.

11-13. A structure according to any one of 8 through 11-12, wherein an object or an image forming member is illuminated by a light source and light of the light source.

11-14. A structure according to any one of 7 through 10-15, or any one of 10-17 through 11-13, wherein evanescent wave is used for image formation.

11-15. A structure according to any one of 8 through 11-14, wherein a distance between the optical element, and an object or an image forming member is variable.

12-10. A structure according to any one of 7 through 11-15, wherein the medium exhibiting negative refraction is surrounded by air.

12-11. A structure according to any one of 7 through 11-15, wherein the medium exhibiting negative refraction is surrounded by vacuum.

12-11-1. A structure according to any one of 7 through 11-13, wherein a refractive index of a surrounding of the medium exhibiting negative refraction is 1.

12-12. A structure according to any one of 7-8 through 7-10, or any one of 10-11 through 11-13, except 10-37, 10-38 and 11-8-1, wherein the optical element made of a medium exhibiting negative refraction is a plane-parallel plate.

13-6. An optical apparatus including an optical system having an optical element made of a medium exhibiting negative refraction, wherein a photonic crystal is used as the medium exhibiting negative refraction, and an axis of the photonic crystal, along which an optimal rotational symmetry is obtained, agrees with an optical axis of the optical system.

14-1. A structure according to any one of 7 through 13-6, wherein the medium exhibiting negative refraction is a negative index medium.

14-2. A structure according to any one of 7 through 13-6, wherein the medium exhibiting negative refraction is a medium exhibiting perfect image formation properties.

What is claimed is:

1. An optical apparatus comprising:
an optical element that is made of a medium exhibiting negative refraction; and
a correction unit that varies a wavelength of light which is emitted from a light source portion in advance, so that the wavelength of light to be used for the optical element is varied before the light enters the optical element, thereby correcting a variation in image forming capability, which occurs due to one of a variation in refractive index of the optical element and a variation in refractive index of a surrounding medium.

2. An optical apparatus comprising:
a light source;
an optical element that is made of a medium exhibiting negative refraction; and
a correction unit that varies a wavelength of light which is emitted from the light source in advance, so that the wavelength of light to be used for the optical element is varied before the light enters the optical element, the correction unit thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

3. An optical apparatus comprising:
a light source with a variable wavelength;
an optical element that is made of a medium exhibiting negative refraction; and
a correction unit that varies a wavelength of emission light, which is emitted from the light source in advance, so that the wavelength of light to be used for the optical element is varied before the light enters the optical element, the correction unit thus correcting one of a variation in refractive index of the optical element and a variation in refractive index of a surrounding medium, thereby correcting a variation in image forming capability due to one of the variation in refractive index of the optical element and the variation in refractive index of the surrounding medium.

4. The optical apparatus according to claim 3, wherein the surrounding medium is air.

5. The optical apparatus according to claim 3, further comprising a light source driving apparatus that drives the light source.

6. The optical apparatus according to claim 5, wherein the correction unit varies a driving parameter of the light source driving apparatus and varies the wavelength of the emission light from the light source, and thus corrects one of a variation in refractive index of the optical element and a variation in refractive index of the surrounding medium, thereby correcting a variation in image forming capability due to one of the variation in refractive index of the optical element and the variation in refractive index of the surrounding medium.

7. The optical apparatus according to claim 3, wherein the light source with a variable wavelength is constructed by making variable a spectral transmittance of a filter that is disposed in an optical path.

8. An optical apparatus comprising:
an optical element that is made of a medium exhibiting negative refraction; and
a correction unit that varies a spectral transmittance of a filter that is disposed in an optical path, and varies a wavelength of light used, the light being emitted from a light source portion in advance, so that the wavelength of light to be used for the optical element is varied before the light enters the optical element, and the correction unit thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

9. An optical apparatus comprising:
an optical element that is made of a medium exhibiting negative refraction; and
a correction unit that varies a spectral transmittance of a filter that is disposed in an optical path, and varies a wavelength of light used, the light being emitted from a light source portion in advance, so that the wavelength of light to be used for the optical element is varied before the light enters the optical element, the correction unit thereby correcting a variation in image forming capability, which occurs due to one of a variation in refractive index of the optical element and a variation in refractive index of a surrounding medium.

10. An optical apparatus comprising:
a light source;
an optical element that is made of a medium exhibiting negative refraction; and
a control unit that limits a wavelength of emission light from the light source within a predetermined tolerable range, the emission light being emitted from the light source in advance, so that the wavelength of light to be used for the optical element is varied before the light enters the optical element, the control unit thereby suppressing a variation in image forming capability due to a variation in wavelength of the emission light from the light source.

11. The optical apparatus according to claim 10, further comprising a light source driving apparatus that drives the light source.

12. An optical apparatus comprising:
a light source;
an optical element that is made of a medium exhibiting negative refraction; and
a correction unit that varies a wavelength of emission light from the light source by replacing the light source, the emission light being emitted from the light source in advance, so that the wavelength of light to be used for the optical element is varied before the light enters the optical element, the correction unit thus correcting one of a variation in refractive index of the optical element and a variation in refractive index of a surrounding medium, thereby correcting a variation in image forming capability, which occurs due to one of the variation in refractive index of the optical element and the variation in refractive index of the surrounding medium.

13. The optical apparatus according to claim 12, wherein the surrounding medium is air.

14. An optical apparatus comprising:
a light source; and
an optical element that is made of a medium exhibiting negative refraction,
wherein at a time of manufacturing the optical apparatus, a wavelength of emission light from the light source is varied by replacing the light source, and an optimal light source is selected, the emission light being emitted from the light source in advance, so that the wavelength of light to be used for the optical element is varied before the light enters the optical element, and thus one of a variation in refractive index of the optical element and a variation in refractive index of a surrounding medium is corrected, thereby correcting a variation in image forming capability, which occurs due to one of the variation in refractive index of the optical element and the variation in refractive index of the surrounding medium.

15. The optical apparatus according to any one of claims 1, 3 and 10, further comprising an optical system including said optical element and an optical element other than said optical element.

16. The optical apparatus according to any one of claims 1, 3 and 10, further comprising an optical system in which the optical element and an image forming optical element are combined and disposed.

17. The optical apparatus according to any one of claims 1, 3 and 10, wherein the optical element is a plane-parallel plate.

18. The optical apparatus according to any one of claims 1, 3 and 10, further comprising a member with a fine structure, wherein the fine structure is imaged.

19. The optical apparatus according to any one of claims 1, 3 and 10, wherein chromatic aberration of an optical system is eliminated within a range of a variation in wavelength of light used.

20. The optical apparatus according to any one of claims 1, 3 and 10, wherein the optical element is surrounded by air or vacuum.

21. The optical apparatus according to any one of claims 1, 3 and 10, wherein a photonic crystal is used as the medium exhibiting negative refraction.

22. The optical apparatus according to any one of claims 1, 3 and 10, wherein the light used is monochromatic light.

23. The optical apparatus according to any one of claims 1, 3 and 10, wherein the light used has a wavelength of between 0.1 μm and 3 μm.

24. The optical apparatus according to any one of claims 1, 3 and 10, wherein evanescent wave is used for image formation.

25. The optical apparatus according to any one of claims 1, 3 and 10, wherein a distance between the optical element, and an object or an image forming member is variable.

26. The optical apparatus according to any one of claims 1, 3 and 10, wherein the medium exhibiting negative refraction is a medium that exhibits perfect image formation properties.

27. An optical apparatus comprising:
an optical element that is made of a medium exhibiting negative refraction; and
a correction unit that varies a wavelength of light used, thereby correcting a variation in image forming capability, which occurs due to one of a variation in refractive index of the optical element and a variation in refractive index of a surrounding medium;
wherein the refractive index of the optical element satisfies the following condition:

$$-3 < n < -0.2 \qquad \text{formula (11)}$$

where n is a refractive index of the medium exhibiting negative refraction.

28. An optical apparatus comprising:
a light source with a variable wavelength;
an optical element that is made of a medium exhibiting negative refraction; and
a correction unit that varies a wavelength of emission light from the light source and thus corrects one of a variation in refractive index of the optical element and a variation in refractive index of a surrounding medium, thereby correcting a variation in image forming capability due to one of the variation in refractive index of the optical element and the variation in refractive index of the surrounding medium;
wherein the refractive index of the optical element satisfies the following condition:

$$-3 < n < -0.2 \qquad \text{formula (11)}$$

where n is a refractive index of the medium exhibiting negative refraction.

29. An optical apparatus comprising:
a light source;
an optical element that is made of a medium exhibiting negative refraction; and
a control unit that limits a wavelength of emission light from the light source within a predetermined tolerable range, thereby suppressing a variation in image forming capability due to a variation in wavelength of the emission light from the light source;
wherein the refractive index of the optical element satisfies the following condition:

$$-3 < n < -0.2 \qquad \text{formula (11)}$$

where n is a refractive index of the medium exhibiting negative refraction.

30. An optical apparatus comprising:
- an optical element that is made of a medium exhibiting negative refraction; and
- a correction unit that varies a wavelength of light used, thereby correcting a variation in image forming capability, which occurs due to one of a variation in refractive index of the optical element and a variation in refractive index of a surrounding medium;

wherein the medium exhibiting negative refraction is a negative index medium.

31. An optical apparatus comprising:
- a light source with a variable wavelength;
- an optical element that is made of a medium exhibiting negative refraction; and
- a correction unit that varies a wavelength of emission light from the light source and thus corrects one of a variation in refractive index of the optical element and a variation in refractive index of a surrounding medium, thereby correcting a variation in image forming capability due to one of the variation in refractive index of the optical element and the variation in refractive index of the surrounding medium;

wherein the medium exhibiting negative refraction is a negative index medium.

32. An optical apparatus comprising:
- a light source;
- an optical element that is made of a medium exhibiting negative refraction; and
- a control unit that limits a wavelength of emission light from the light source within a predetermined tolerable range, thereby suppressing a variation in image forming capability due to a variation in wavelength of the emission light from the light source;

wherein the medium exhibiting negative refraction is a negative index medium.

* * * * *